(12) United States Patent
Saltenberger et al.

(10) Patent No.: US 8,911,190 B2
(45) Date of Patent: Dec. 16, 2014

(54) BLIND RIVET WITH A PLASTIC RIVET BODY

(75) Inventors: Reimar Saltenberger, Giessen (DE); Johann A. Reindl, Giessen (DE); Stephan Schneider, Giessen (DE)

(73) Assignee: Newfrey LLC, Newark, DE (US)

( * ) Notice: Subject to any disclaimer, the term of this patent is extended or adjusted under 35 U.S.C. 154(b) by 17 days.

(21) Appl. No.: 13/617,415

(22) Filed: Sep. 14, 2012

(65) Prior Publication Data

US 2013/0243542 A1 Sep. 19, 2013

Related U.S. Application Data

(63) Continuation of application No. PCT/EP2010/063498, filed on Sep. 14, 2010.

(30) Foreign Application Priority Data

Mar. 15, 2010 (DE) .......................... 10 2010 002 847

(51) Int. Cl.
*F16B 19/10* (2006.01)
*F16B 5/04* (2006.01)

(52) U.S. Cl.
CPC ......... *F16B 19/1054* (2013.01); *F16B 19/1045* (2013.01); *F16B 5/04* (2013.01)
USPC .................................. 411/38; 411/34; 411/43

(58) Field of Classification Search
CPC .................... F16B 19/1054; F16B 19/1045
USPC ................................................ 411/34, 38, 43
See application file for complete search history.

(56) References Cited

U.S. PATENT DOCUMENTS

| | | | | |
|---|---|---|---|---|
| 2,030,167 A * | 2/1936 | Miller | ............................. | 411/34 |
| 3,136,203 A * | 6/1964 | Davis | ............................. | 411/38 |
| 3,365,998 A * | 1/1968 | Zahodiakin | ..................... | 411/34 |
| 4,318,650 A * | 3/1982 | LLauge | ............................ | 411/38 |
| 4,355,934 A * | 10/1982 | Denham et al. | .................. | 411/38 |
| 4,402,638 A * | 9/1983 | Tanaka | ............................. | 411/34 |
| 4,639,174 A * | 1/1987 | Denham et al. | ................. | 411/34 |
| 4,639,175 A * | 1/1987 | Wollar | .............................. | 411/38 |
| 4,875,815 A * | 10/1989 | Phillips, II | ....................... | 411/38 |
| 5,030,050 A | 7/1991 | Auriol et al. | | |
| 2007/0154277 A1 | 7/2007 | Smith et al. | | |

* cited by examiner

*Primary Examiner* — Flemming Saether
(74) *Attorney, Agent, or Firm* — Michael P. Leary

(57) ABSTRACT

A blind rivet made of plastic, the shank of the body has a first region located between the head and the foot end, and the first region has a reduced first wall thickness. Within the first region is located a second region with a second wall thickness further reduced as compared to the first region. The first and second regions are arranged such that, as a result of the rivet setting process, the wall of the shank forms a roll fold with an annular bead that is pressed axially against the blind side of the workpiece.

20 Claims, 2 Drawing Sheets

BLIND RIVET WITH A PLASTIC RIVET BODY

CROSS-REFERENCE TO RELATED APPLICATIONS

This application is a continuation of PCT/EP2010/063498, filed Sep. 14, 2010 which claims priority from German Patent Application No. DE 10 2010 002 847.9, filed on Mar. 15, 2010, the disclosure of which is incorporated herein by reference.

BACKGROUND OF THE INVENTION

The invention relates to a blind rivet having a hollow rivet body made of plastic, which has an elongated shank that extends coaxially to a longitudinal center axis of the blind rivet and has a bore, having a head extending radially at one end of the shank for contact with an accessible side of a workpiece, and having, at the opposite end, a foot end that is passed through an opening in the workpiece, and having, located in the bore of the rivet body, a mandrel that has a mandrel shank with a drawing end projecting out of the head of the rivet body and with a mandrel head that stands in operative connection with the foot end of the rivet body in order to transmit a force to the rivet body during setting of the blind rivet.

Blind rivets are used to permanently join workpieces that are in contact with one another. The workpieces typically have holes passing through them that are brought into alignment with one another and into which the blind rivet is placed and then fastened by deformation. A fastened blind rivet results in a clearance-free seating in the holes of the workpieces and clamps the workpieces together. Normally, a blind rivet is never removed again. However, in cases in which repair of the joined parts is necessary or when a blind rivet has been set incorrectly, it is necessary to remove a blind rivet.

In the automotive industry, uses of blind rivets include fastening door module supports that are populated with attached parts such as power-window motors, loudspeakers, and other parts if applicable, to the door frame using multiple blind rivets. Failures of individual attached parts can make it necessary for doors to be disassembled and the door module supports to be removed. The blind rivets previously used must be drilled out for the disassembly. During this process, wandering of the drill can occur when the rivet mandrel is made of a relatively hard material, such as steel, and the rivet body is made of a relatively soft material, such as aluminum. Thus it is not uncommon for the door frame and also the module support to be damaged during the drilling-out process. The drilling chips and removed parts of the rivet fall to the ground or even into the blind area of the door, and can only be removed from the latter with extra effort. There is thus a need to create a blind rivet for these and other applications which can be released in a simple manner and can be removed in a single piece. In addition, the blind rivet must be simple to install and must join the workpieces firmly and permanently to one another after assembly.

A blind rivet that is intended to be removed in a single piece is known from EP 1 728 569 A1. In this blind rivet, which has a rivet body with a head designed as a flange and has a rivet mandrel passing through the rivet body, the rivet mandrel is shaped such that it can be pulled at least partially through the rivet body and out of the end of the rivet body opposite the flange during setting of the blind rivet. In addition, the flange is provided with a stepped region for the placement of a rivet removal tool, with the flange being dimensioned such that it does not deform or break when the rivet is withdrawn. In this blind rivet, the rivet body is made of plastically deformable metal and is dimensioned such that it projects only a short distance on the blind side of the workpieces. Accordingly, setting of the rivet forms only a comparatively small bead, which can be pressed together by a tensile force acting on the rivet body, in order to thus allow the blind rivet to be pulled from the holes in the workpieces. However, it is disadvantageous here that the holding forces of the blind rivet are very limited, and, like the release forces, are strongly dependent on manufacturing-related dimensional variations in the holes and the rivet parts.

In addition, from DE 29 06 250 A1 is known a plastic blind rivet with a mandrel having an expanded head and a rivet body surrounding the mandrel, in which the mandrel has a series of engagement teeth on its outer circumference, and the wall surface of the rivet body has a series of anchor steps suitable for engaging the engagement teeth. The rivet body is provided with a flange-like head part and with an end that is inseparably joined to the mandrel head, and is deformed during setting of the blind rivet by partial withdrawal of the mandrel from the rivet body such that a part of the wall surface of the rivet body adjacent to the mandrel head is folded outward around the mandrel head and, together with the mandrel head, is pulled into the other part of the wall surface, with the latter bulging outward. In this process, the folded section of the wall surface is forced in between the mandrel head and the unfolded section of the wall surface, in which process the unfolded wall section must be stretched very severely. This requires relatively high forces for setting the blind rivet and results in severe stressing of the plastic material, restricting the choice of material. The prior art plastic blind rivet is not designed for easy removal of the set blind rivet.

BRIEF SUMMARY

The object of the invention is to create a blind rivet of the initially mentioned type that can be fastened with the exertion of comparatively little force and that can be released in a simple manner and removed from the fastening hole in a single piece. The blind rivet should additionally be suitable for joining workpieces to one another reliably and durably, and to press the workpieces against one another at the joint with force.

According to the invention, this object is achieved by a blind rivet with the features specified in claim 1. Advantageous embodiments of the blind rivet are specified in claims 2 through 16.

The blind rivet according to the invention has a hollow body made of plastic, which has an elongated shank that extends coaxially to a longitudinal center axis of the blind rivet and has a bore, a head extending radially at one end of the shank for contact with an accessible side of a workpiece and, at the opposite end, a foot end that is passed through an opening in the workpiece. Located in the rivet body is a mandrel that has a mandrel shank with a drawing end projecting out of the head of the rivet body and has a mandrel head that stands in operative connection with the foot end of the rivet body in order to transmit a force to the rivet body during setting of the blind rivet. The shank of the rivet body has, located between the head and the foot end, a first region with reduced cross-section and reduced wall thickness as compared to the regions adjoining the head and the foot end, wherein a second region with reduced cross-section and reduced wall thickness as compared to the first region is located within the first region in such a manner that, as a result of a process in which the head is pressed against one side of the workpiece and the foot end is simultaneously drawn toward the other side of the workpiece with the aid of the mandrel, the wall of the section of the first region located between the foot end and the second region forms a roll fold that on the outside rests against the section located between the head and the second region, and forms an annular bead pressed against the workpiece.

In the blind rivet according to the invention, during the fastening process the shank of the rivet body forms an annular bead on the blind side of the workpiece due to the folding; the annular bead surrounds a part of the shank adjoining the workpiece and rests against the edge region of the mounting hole surrounding the mounting hole in the workpiece, and is pressed firmly against the workpiece by the tensile force exerted on the mandrel that is transmitted by the mandrel head to the foot end of the folded shank In this way, a strong axial contact pressure is achieved between the workpieces joined by the blind rivet, since the tensile force exerted during fastening of the rivet is transmitted directly to the workpiece without deflection, and the axial contact pressure need not be achieved through components of a force spreading the rivet shank apart. The blind rivet according to the invention further has the advantage that the annular bead of the folded shank resting against the blind side of the workpiece produces a good seal. This seal results not only from the strong contact pressure of the annular bead, but also profits from the fact that the annular bead works together with the edge of the workpiece surrounding the mounting hole at a distance from the mounting hole, so that damage or faulty formation of the hole edge cannot impair the seal. Even an eccentric position of the blind rivet with respect to the mounting hole is compensated by the larger diameter of the annular bead, and does not impair the seal action.

Another advantage of the blind rivet according to the invention can be seen in that, in the fastened state, the part of the shank extending from the foot end to the contact surface of the annular bead is loaded with the axial clamping force. This part of the shank experiences an elastic compression due to the axial clamping force, and thus creates a spring action that counteracts vibratory loads and reduces effects on the clamping force caused by temperature changes. It is a matter of course that a prerequisite for maintaining the clamping force is that the mandrel is anchored in the shank of the blind rivet in the fastened position in a known manner with the aid of locking means.

The blind rivet according to the invention can also be removed again in a single piece from the mounting hole penetrating the workpieces without great effort. To this end, it is sufficient to drive the mandrel back a distance in the direction of the blind side while overcoming or destroying its anchoring in the shank with the aid of a driving tool, but without pushing it completely out of the shank. Driving the mandrel back relaxes the folded shank, and its foot end comes free from the mandrel head. If the head of the rivet body is then pulled with the aid of a removal tool, such as is known from the aforementioned EP 1 728 569 A1, for example, the roll fold can be pushed back and the rivet body can be pulled out of the mounting opening together with the mandrel held therein. In this way, the blind rivet can be released and removed for purposes of repair without remnants remaining on the blind side of the workpieces. To simplify the removal of the blind rivet, the head of the rivet body can have a tool engagement region, for example an undercut or a recess, in which a removal or pulling tool can engage. Furthermore, a guide for a driving tool to drive back the mandrel can be formed on the head of the rivet body.

The blind rivet according to the invention is suitable both for setting with hand-operated tools and for automated riveting processes. For automated processing, the head of the rivet body can be attached to, or formed on, one or more belts, bands, or wires that hold a plurality of blind rivets in a row.

According to another proposal of the invention, provision can be made for the wall thickness of the first region of the shank to decrease from the ends of the region towards the region center. In this way, the desired deformation behavior is facilitated and stress on the material is reduced.

In addition, it is advantageous for the wall thickness of the second region to be approximately 50% of the wall thickness of the first region, wherein the axial extent of the second region corresponds to essentially twice its wall thickness. The second region is preferably arranged such that it subdivides the first region into two sections. Moreover, the wall thickness of the section of the first region adjacent to the head can be greater than the wall thickness of the section of the first region adjacent to the foot end.

It has also proven beneficial if the wall of the shank in the region subjected to folding can deform radially inward, reducing the bore diameter, during the deformation resulting from the fastening process. In order to permit this, according to the invention the part of the bore of the rivet body surrounded by the first region and the foot end can have a radial separation from the mandrel shank concentrically located in the bore.

In a preferred embodiment of the blind rivet, the bore of the rivet body has a first conical bore section whose diameter increases towards the foot end, and a second conical bore section whose diameter increases towards the head, wherein the ends of the first and second conical bore sections with greater diameters terminate at a point in the shank that is located on the side facing the foot end at a distance from the second region with reduced cross-section and reduced wall thickness within the first region with reduced cross-section and reduced wall thickness. In this way, there results a reduced wall thickness at the point where the conical bore sections meet, by means of which the location and formation of the fold that forms the annular bead contacting the workpiece can be determined.

According to the invention, the mandrel shank has locking means, by which at least a section of the mandrel shank can be held in the rivet body. The locking means may take the form of sawtooth-shaped rolling or embossing, or even a thread, in particular a coarse thread. During fastening of the blind rivet, rivet body material penetrates the intermediate spaces of the rolling, embossing, or thread, so that an essentially interlocking securing of the mandrel shank is achieved. If the mandrel shank is provided with a thread, and can thus have a tool engagement region that is still present and accessible after fastening of the blind rivet, then the mandrel can be axially moved towards the blind side by rotation in order to thereby provide the prerequisites for subsequent withdrawal.

For engagement of the locking means, the bore of the rivet body adjacent to the head can have a cylindrical bore section whose diameter is smaller than the diameter of the locking means formed on the mandrel shank. In addition, according to another proposal of the invention, locking elements such as grooves, channels, steps, ribs, or teeth, which work together with the locking means of the mandrel shank and can latch with the mandrel shank in order to axially secure the mandrel in the rivet body, can be provided in the bore of the rivet body.

According to the invention, the mandrel can be made of metal or plastic. With a mandrel made of metal, a significantly higher fatigue strength and a greater thermal stability can be achieved. The shank of the mandrel preferably has a predetermined breaking point where it is possible to separate the drawing part of the shank, which is gripped by the riveting tool and which projects from the rivet body after fastening of the blind rivet. The mandrel may consist of a single piece or may also be composed of two or more parts. For example, the junction point of two mandrel parts that make up the mandrel can simultaneously serve as the predetermined breaking point.

According to another proposal of the invention, provision can be made for a stop that projects radially inward to be formed in the bore of the rivet body in the region of the head, and for the mandrel shank to have a step that works together with the stop to limit the drawing travel of the mandrel shank. This embodiment is suitable for predetermined clamping thicknesses and has the advantage that the distance between the head of the rivet body and the annular bead that forms during fastening of the blind rivet can be established regardless of the stiffness of the workpieces to be joined, thus achieving a highly precise repeatability of the rivet fastening process. In addition, this causes the clamping force achieved during fastening of the blind rivet to become independent of the breaking strength of the predetermined breaking point provided on the mandrel shank, so that the breaking strength can be designed higher than the clamping force in order to avoid disadvantages resulting from manufacturing-related fluctuations in breaking strength. Without a defined limit to the mandrel drawing travel, the clamping force is largely determined by the breaking strength of the predetermined breaking point, wherein the clamping thickness can vary.

The head of the rivet body can be designed, according to the invention, as a spring washer that has a concave contact surface on the side facing the shank. As a result of the spring action of the spring washer, the clamping thickness of the blind rivet is expanded and, in addition, the elasticity of the clamping of the workpieces joined by the blind rivet is increased, so that tolerances in the workpiece thickness can be compensated.

It has additionally proven advantageous for the mandrel head to have a contact surface against which rests an end face of the foot end of the rivet body, wherein the contact surface is part of a concave conical surface whose generating line forms, with the longitudinal center axis, an angle of less than 90°, in particular of essentially 80°. As a result of this design of the mandrel head, a force component that is directed radially inward acts on the head end of the rivet body during the fastening process, opposing a radial widening of the foot end of the rivet body. It is ensured by this means that the foot end of the rivet body cannot slip off the contact surface of the mandrel head during the fastening process.

BRIEF DESCRIPTION OF THE DRAWINGS

The invention is explained in detail below with reference to an exemplary embodiment that is shown in the drawings. They show.

DETAILED DESCRIPTION OF THE PREFERRED EMBODIMENTS

Figure 1:
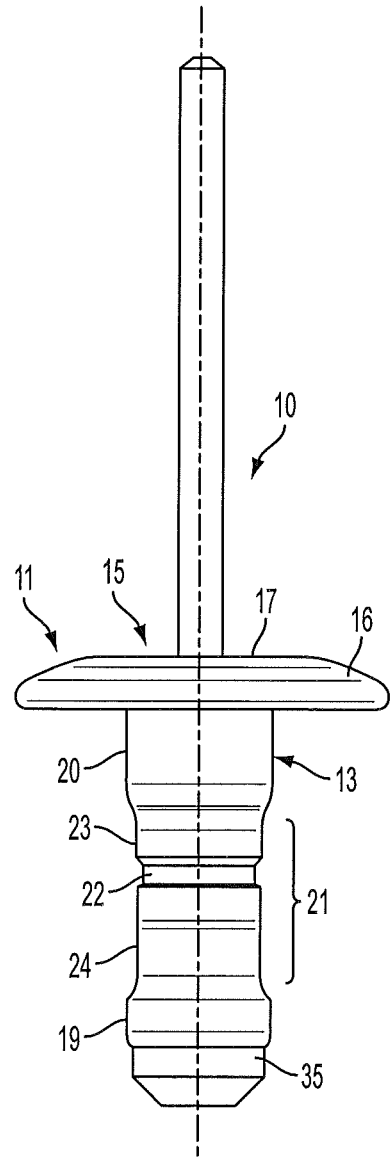
FIG. 1 is a view of a blind rivet according to the invention.
Figure 2:
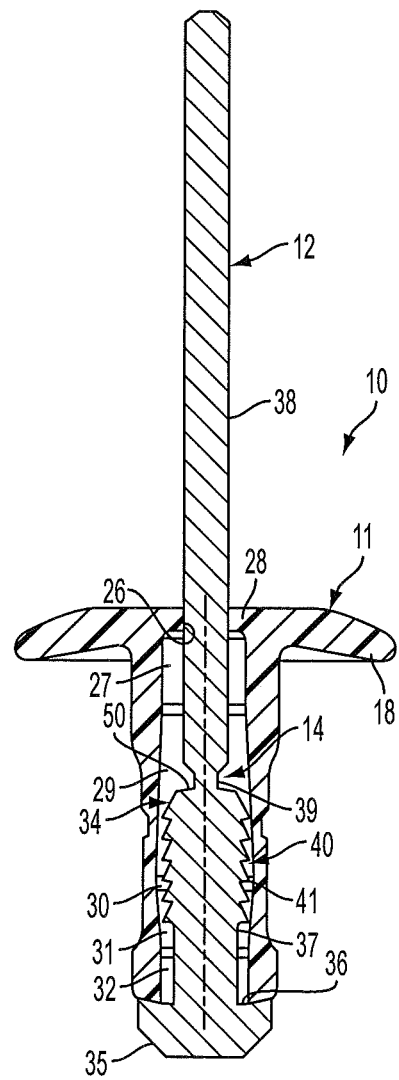
FIG. 2 is a cross-section of the blind rivet from FIG. 1.

The blind rivet 10 shown in FIGS. 1 and 2 consists of a rivet body 11 and a mandrel 12. The rivet body 11 is made of plastic and has an elongated shank 13 with a through-bore 14, in which the mandrel 12 is located. One end of the shank 13 forms a head 15, which takes the form of a disk-shaped flange 16 and is intended to contact an accessible side of a workpiece. On the side facing away from the shank 13, the head 15 has a flat support surface 17 for supporting the forward end of a rivet setting tool. The flange 16 radially overhanging the shank 13 is domed in the manner of a spring washer, and has a concave contact surface 18 on the side facing the shank 13. As a result, the flange 16 can yield elastically when the head 15 of the blind rivet 10 is pressed against a workpiece.

The end of the shank 13 opposite the head 15 constitutes a foot end 19; with said foot end forward, the shank 13 is passed through the mounting openings of workpieces to be joined to one another. The foot end 19 and a head section 20 of the shank 13 adjoining the head 15 have a cylindrical outer surface and have essentially the same outside diameter. Extending between the head section 20 and the foot end 19 is a first cylindrical region 21 of the shank 13, whose outside diameter is approximately 10% to 20%, in particular 15%, smaller than the outside diameter of the head section 20. The transitions from the head section 20 and the foot end 19 to the first region 21 are conical and are rounded to a greater or lesser degree. Located within the first region 21 is a second region 22 with a relatively short axial length, which has an outside diameter that is smaller yet again by approximately 10%. The second region 22 subdivides the first region 21 into a first section 23 adjacent to the head section 20 and a second section 24 adjacent to the foot end 19, wherein the axial length of the first section 23 is approximately half the axial length of the second section 24. The edges of the second region 22 are conical, with their mutual separation increasing radially towards the outside. The second region 22 thus has approximately the shape of an annular groove with a trapezoidal cross-section expanding towards the outside. However, the shape of the annular groove 22 forming the second region is not restricted hereto, it may instead also be rectangular or triangular and rounded at the corners. The axial length of the second region 22 is approximately twice the size of its wall thickness.

The bore 14 passing through the rivet body 11 has different bore sections. The head 15 contains a first cylindrical bore section 26 with a relatively small inside diameter, which is adjoined by a second cylindrical bore section 27 with a larger inside diameter. The bore sections 26, 27 are separated from one another by a radial shoulder, which constitutes a stop 28 for the shank of the mandrel 12. The bore section 27 is adjoined by a first conical bore section 29, whose inside diameter increases towards the foot end 19. The bore section 29 terminates with its largest diameter at a transition point 30, which is located approximately in the center of the second section 24 of the first region of the shank 13. Extending towards the foot end 19 from the transition point 30 is a second conical bore section 31 whose inside diameter decreases towards the foot end 19. Thus, the bore 14 has the largest inside diameter at the transition point 30. The transition point 30 can consist of the abutting bore sections 29, 31, but it can also consist of a narrow annular surface. The second conical bore section 31 terminates with its smallest inside diameter at a third cylindrical bore section 32, which extends through the foot end 19 of the shank 13.

The mandrel 12 has an elongated mandrel shank 34 and a mandrel head 35 located at one end of the mandrel shank 34. The mandrel head 35 has a greater diameter than the mandrel shank 34 and has, on the side facing the mandrel shank 34, a contact surface 36 for the foot end 19 of the shank 13. The contact surface 36 is in the shape of a concave conical surface whose generating line forms, with the longitudinal center axis of the mandrel 12, an angle of essentially 80°. The end of the mandrel head 35 opposite the contact surface 36 is in the shape of a truncated cone in order to facilitate insertion of the blind rivet 10 in the mounting opening of the workpieces. The mandrel shank 34 has a mounting part 37 with larger diameter and a drawing part 38 with smaller diameter. Located between the mounting part 37 and the drawing part 38 is a predetermined breaking point 39, which has a smaller cross-section than the drawing part 38. The end of the mounting part 37 adjacent to the predetermined breaking point forms a step face 50, which works together with the stop 28 of the rivet body 11 to limit the drawing travel of the mandrel shank 34.

On part of its length, the mounting part 37 has locking means 40 in the form of ring-shaped ribs 41, which are spaced apart from one another and have a sawtooth-like cross-section that is composed of conical surfaces and radial surfaces. The conical surfaces of the ribs 41 face the predetermined breaking point 39, in order to make it easier for the ribs 41 to penetrate the locking region of the shank 13, which is composed of the cylindrical bore section 27 and the initial end of the conical bore section 29. The outside diameter of the ribs 41 is slightly larger than the inside diameter of the bore section 32 in the foot end 19 of the shank 13. As a result, the mandrel 12 is held fast after insertion into the bore 14 of the shank 13, so that the rivet body 11 and the mandrel 12 compose an easy-to-manipulate unit. The drawing part 38 is located in the bore section 26 here, and is carried therein. However, the outside diameter of the ribs 41 of the mandrel 12 is smaller than the inside diameter of the bore 14 in the region where the ribs 41 are located when the mandrel 12 is inserted fully in the shank 13. Consequently, an annular gap is present between the ribs 41 and the wall of the shank 13, which permits a limited constriction of the wall of the shank 13 during fastening of the blind rivet 10.

Figure 3:
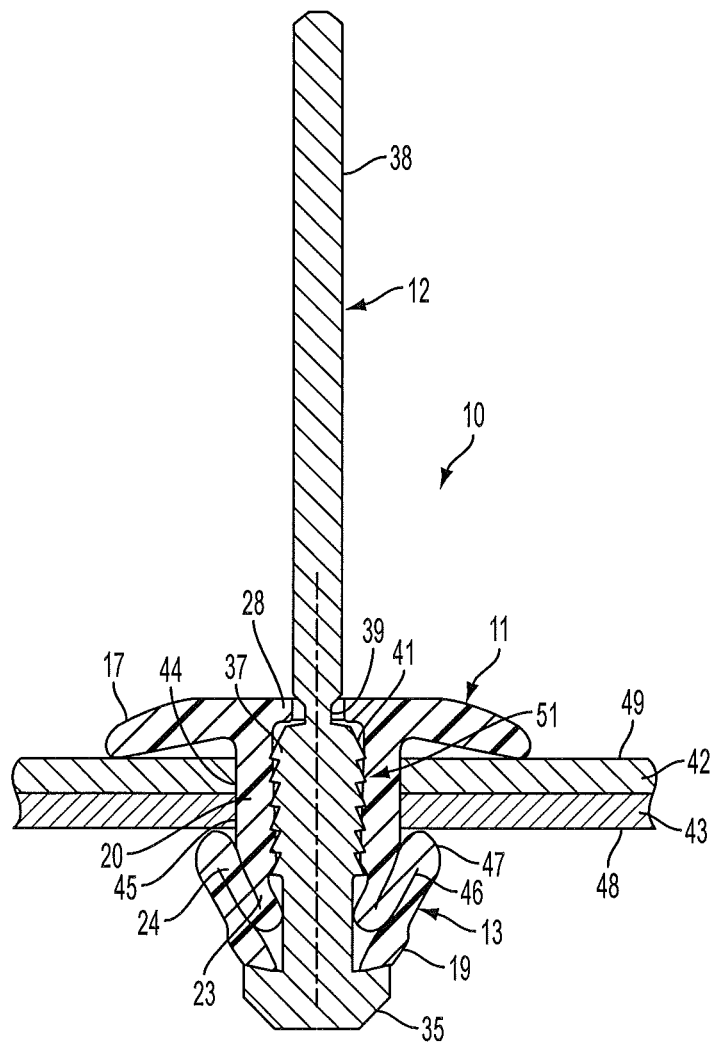
FIG. 3 is a cross-section through a joining of two workpieces using a blind rivet according to the invention.

As is shown in FIG. 3, in order to join two workpieces 42, 43 the blind rivet 10 is inserted in aligned mounting openings 44, 45 of the workpieces 42, 43 and then, with the aid of a setting tool that bears on the support surface 17, is fastened by the exertion of a tensile force on the drawing part 38 of the mandrel 12. In FIG. 3 the blind rivet 10 is in the state of nearly finished installation, in which break-off of the drawing part 38 is imminent. The mounting part 37 of the mandrel 12 is drawn fully into the locking region 51 in the head section 20 of the shank 13 here, and its end face 50 adjacent to the predetermined breaking point 39 rests against the stop 28. During displacement of the mandrel 12 into the position shown, the wall of the shank 13 was folded outward in the region of the second section 24 and a roll fold 46 lying over the first section 23 was formed that surrounds, with an annular bead 47, the end of the head section 20 projecting out of the workpiece 43 on the blind side 48 and is pressed against the blind side 48 of the workpiece 43 at the annular bead 47. The annular bead 47 bears against the mandrel head 35 in the axial direction through the foot end 19, said mandrel head being held fast by the ribs 41 in the head section 20 of the shank 13. On the access side 49 of the workpiece 42 opposite the blind side 48, the flange 17 rests against the workpiece 42 and transmits the reaction force from the pressing force of the annular bead 47 to the workpiece 42. The two workpieces 42, 43 are thus firmly clamped and braced against one another between the annular bead 47 and the flange 17.

The tight seal of the joint produced with the aid of the blind rivet 10 is achieved primarily by the firm contact of the flange 17 and of the annular bead 47. The bore 14 passing through the shank 13 is sealed by the contact pressure of the foot end 19 on the mandrel head 35 and additionally by the engagement of the ribs 41 in the head section 20.

The invention is not limited to the exemplary embodiment described, but instead can be realized in a great number of other variants. Thus, for example, the rivet body can be integrated in a component, for example a holder for lines, cables, or modules, in order to mount the component in a single step by fastening the blind rivet in the opening of a support part. The rivet body made of plastic can also be covered with a softer material layer in a two-component injection process, in order to achieve functions such as vibration damping or to further improve the water-tightness. The rivet body made of plastic additionally provides the option of fastening components to support parts in an electrically insulating manner. If electrically conductive connections are to be produced, for example in order to permit electrostatic discharge, this can be achieved by making the rivet body out of electrically conductive plastics. For use in visible areas, the rivet body can be made of colored plastic, with it being possible to match the color to the specific application.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A blind rivet for joining by a rivet setting process a first workpiece including an accessible side and a second workpiece including a blind side, the blind rivet comprising:
 a hollow rivet body made of plastic, the body including:
  an elongated shank that defines an axial bore that extends coaxially to a longitudinal center axis of the blind rivet;
  a head extending radially from a first end of the shank for contact with the accessible side of the first workpiece; and
  a foot end located at a second end of the shank and passable through an opening formed through the first workpiece and second workpiece, and the blind rivet further comprising:
 a mandrel slidably located in the bore of the rivet body, the mandrel including:
  a mandrel shank with a drawing end projecting out of the head of the rivet body;
  a mandrel head that stands in operative connection with the foot end of the rivet body in order to transmit a force to the rivet body during the rivet setting process, and:
 characterized in that the shank of the rivet body, between the head and the foot end, includes
  a first region with a first wall thickness reduced as compared to a head section of the shank and the foot end;
  a second region, located within the first region, and with a second wall thickness reduced as compared to the first wall thickness of the first region; and
  the bore of the rivet body further includes: a first conical bore section defining a first diameter that increases towards the foot end, and a second conical bore section opposed to the first conical bore section and defining a second diameter that decreases towards the foot end, and wherein the ends of the first conical bore section and second conical bore sections with greatest diameter a roach a transition point in the shank that is located axially between the second region and the foot end.

2. A blind rivet according to claim 1, wherein the first wall thickness of the first region decreases from a first end of the first region proximate to the head towards a center of the first region.

3. A blind rivet according to claim 1, wherein the second wall thickness of the second region is 50% of the first wall thickness of the first region.

4. A blind rivet according to claim 3, wherein an axial length of the second region is twice the second wall thickness of the second region.

5. A blind rivet according to claim 1, wherein the second region subdivides the first region into a first section and a second section, and the first wall thickness of the first section of the first region adjacent to the head is greater than a third wall thickness of the second section of the first region adjacent to the foot end.

6. A blind rivet according to claim 5, and wherein, after completion of the rivet setting process in which the rivet body head is pressed against the accessible side of the first workpiece and the rivet body foot end is drawn toward the blind side of the second workpiece by axial movement of the mandrel within the body, then the wall of the second section of the first region, located between the foot end and the second region, forms a roll fold that is pressed radially against the part of the shank located between the head and the second region, and forms an annular bead pressed axially against the blind side of the second workpiece.

7. A blind rivet according to claim 1, wherein a part of the bore defined by the first region of the rivet body there is defined a radial separation between the mandrel shank and an inner surface of the first region.

8. A blind rivet according to claim 1, wherein the mandrel shank further includes a locking means by which the mandrel shank can be nonslidably held in the rivet body upon completion of the rivet setting process.

9. A blind rivet according to claim 8, wherein the locking means includes one of a coarse thread or sawtoothing.

10. A blind rivet according to claim 8, wherein the bore of the rivet body adjacent to the head includes a cylindrical bore section that defines an inner diameter smaller than an outer diameter of the locking means formed on the mandrel shank.

11. A blind rivet according to claim 1, wherein the rivet body includes a stop formed in the head and which projects radially inward into the bore, and the mandrel shank includes a radially outward step axially engageable with the stop to limit the drawing travel of the mandrel shank during the rivet setting process.

12. A blind rivet according to claim 1, wherein the mandrel head includes a contact surface against which rests an end face of the foot end of the rivet body, and the contact surface is a concave conical surface, and the conical surface and the longitudinal center axis define between them an angle of less than 90°.

13. A blind rivet according to claim 12, wherein the angle defined between the conical surface and the longitudinal center axis is 80°.

14. A blind rivet according to claim 1, wherein the head of the rivet body includes a flange formed as a spring washer further including a concave contact surface on a side facing the shank.

15. A blind rivet for joining by a rivet setting process a first workpiece including an accessible side and a second workpiece including a blind side, the blind rivet comprising:

a mandrel defining a central longitudinal central axis of the blind rivet, and including a mandrel shank with a drawing end and a mandrel head, and:

a hollow rivet body made of plastic, the body including:
  a tubular elongated shank that defines an axial bore that extends coaxially around the longitudinal center axis of the blind rivet;
  a head extending radially from a first end of the shank for contact with the accessible side of the first workpiece;
  a foot end located at a second end of the shank and passable through an opening formed through the first workpiece and second workpiece; and wherein the shank of the rivet body, between the head and the foot end, includes:
  a head section proximate the head with a first wall thickness;
  a foot section proximate the foot end with a second wall thickness;
  a first intermediate region located axially between the head section and the foot section and with a third wall thickness less than the first wall thickness and the second wall thickness; and
  a second intermediate region, located axially within the first region, and with a fourth wall thickness less than the third wall thickness; and wherein the bore of the rivet body includes:
  a first conical bore section defining a first diameter that increases towards the foot end;
  a second conical bore section opposed to the first conical bore section and defining a second diameter that decreases towards the foot end; and
  wherein the ends of the first conical bore section and second conical bore sections with greatest diameter approach a transition point that is located axially between the second intermediate region and the foot end.

16. A blind rivet according to claim 15, wherein the second region subdivides the first region into a first section and a second section, and the third wall thickness of the first section of the first region adjacent to the head section is greater than a fifth wall thickness of the second section of the first region adjacent to the foot section.

17. A blind rivet according to claim 15, wherein a part of the bore defined by the first intermediate region of the rivet body there is defined an annular separation radially between the mandrel shank and the rivet body.

18. A blind rivet according to claim 15, wherein the mandrel shank further includes a locking means located radially inward of the first intermediate region of the rivet body shank.

19. A blind rivet according to claim 18, wherein the locking means includes at least one ring shaped rib.

20. A blind rivet according to claim 18, wherein the bore of the rivet body defined by the head section defines an inner diameter smaller than an outer diameter of the locking means formed on the mandrel shank.

* * * * *